| (12) | United States Patent | (10) Patent No.: | US 10,613,388 B2 |
|---|---|---|---|
| | Chen et al. | (45) Date of Patent: | Apr. 7, 2020 |

(54) BACKLIGHT MODULE AND DISPLAY DEVICE

(71) Applicant: AU OPTRONICS CORPORATION, Hsin-Chu (TW)

(72) Inventors: Ming-Lung Chen, Hsin-Chu (TW); Ming-Chun Hsu, Hsin-Chu (TW); Li-Jia Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/285,291

(22) Filed: Feb. 26, 2019

(65) Prior Publication Data

US 2019/0271882 A1    Sep. 5, 2019

(30) Foreign Application Priority Data

Mar. 2, 2018  (TW) .............................. 107107133 A

(51) Int. Cl.
*G02F 1/1335*    (2006.01)

(52) U.S. Cl.
CPC .................. *G02F 1/133611* (2013.01); *G02F 2001/133607* (2013.01)

(58) Field of Classification Search
CPC ... G02F 1/133611; G02F 2001/133607; G02F 1/133606; G02F 1/133603
See application file for complete search history.

(56) References Cited

U.S. PATENT DOCUMENTS

| 10,047,930 | B2 * | 8/2018 | Kim .......................... F21K 9/64 |
| 2009/0097229 | A1 | 4/2009 | Wood et al. | |
| 2013/0193836 | A1 * | 8/2013 | Seibel, II .............. H01L 33/504 |
| | | | 313/498 |

FOREIGN PATENT DOCUMENTS

CN          101878437 A     11/2010

\* cited by examiner

*Primary Examiner* — Donald L Raleigh
(74) *Attorney, Agent, or Firm* — WPAT, PC

(57) ABSTRACT

A backlight module includes a plurality of light emitting elements and a plurality of lens structures. Each light emitting element has a light emitting surface. The plurality of lens structures covers each light emitting element. Each lens structure has a light exit surface having a curved shape. The light exit surface has a vertex and a focal point located between the vertex and the light emitting element. The distance between the focal points of two adjacent lens structures is a first distance, and each light emitting element has a light emitting width. The ratio of the first distance to the light emitting width is greater than or equal to 10.

13 Claims, 8 Drawing Sheets

BACKLIGHT MODULE AND DISPLAY DEVICE

FIELD OF THE INVENTION

The present invention relates to a backlight module and a display device. Specifically, the present invention relates to a direct-light type backlight module and a display device.

BACKGROUND OF THE INVENTION

Display devices have been extensively applied to various electronic devices such as mobile phones, digital cameras, notebook computers, televisions, and hosts used for vehicles. In order to improve users' visual experience, the industry is continually improving the optical performance of the display devices.

Taking a quantum dot (QD) display as an example, color saturation can be improved by using a quantum dot color enhancement film or a quantum dot color filter. Some quantum dot displays need a collimated light source to excite quantum dots. However, the viewing angle of the full width at half maximum of a light source provided by an existing backlight module is still undesirable, in which the backlight module fails to provide collimated light rays according to needs. In addition, bright spots distributed like an array are formed when using collimated light rays, which causes uneven brightness and should be avoided. Therefore, to provide a collimated light source and avoid uneven brightness is an important subject in the industry.

SUMMARY OF THE INVENTION

One of the objectives of the present invention is to provide a backlight module that generates relatively collimated light rays than the backlight module in the prior art.

One of the objectives of the present invention is to provide a display device with improved light uniformity.

The backlight module includes a plurality of light emitting elements and a plurality of lens structures. Each light emitting element has a light emitting surface. Each plurality of lens structures covers each light emitting element respectively. Each lens structure has a light exit surface having a curved shape. The light exit surface has a vertex and a focal point located between the vertex and the light emitting element. The distance between the focal points of two adjacent lens structures is a first distance, and each light emitting element has a light emitting width. The ratio of the first distance to the light emitting width is greater than or equal to 10.

The display device includes a backlight module and a display panel disposed on a side of the backlight module. The distance between the vertex of each lens structure of the backlight module and the display panel is an optical distance (OD). The ratio of the optical distance to a first distance (L1) is greater than or equal to 10. In this way, the light exit uniformity of the display device is improved.

DETAILED DESCRIPTION OF THE PREFERRED EMBODIMENTS

The present invention provides a backlight module and a display device using the backlight module. In this way, collimated light rays can be provided by adjusting the size of a lens structure and the relative position between the backlight module and the display panel, and light can be uniformly emitted when the display device is in operation. The display device, for example, is a liquid crystal display device using a quantum dot technology, but is not limited thereto.

First Embodiment

Figure 1A:
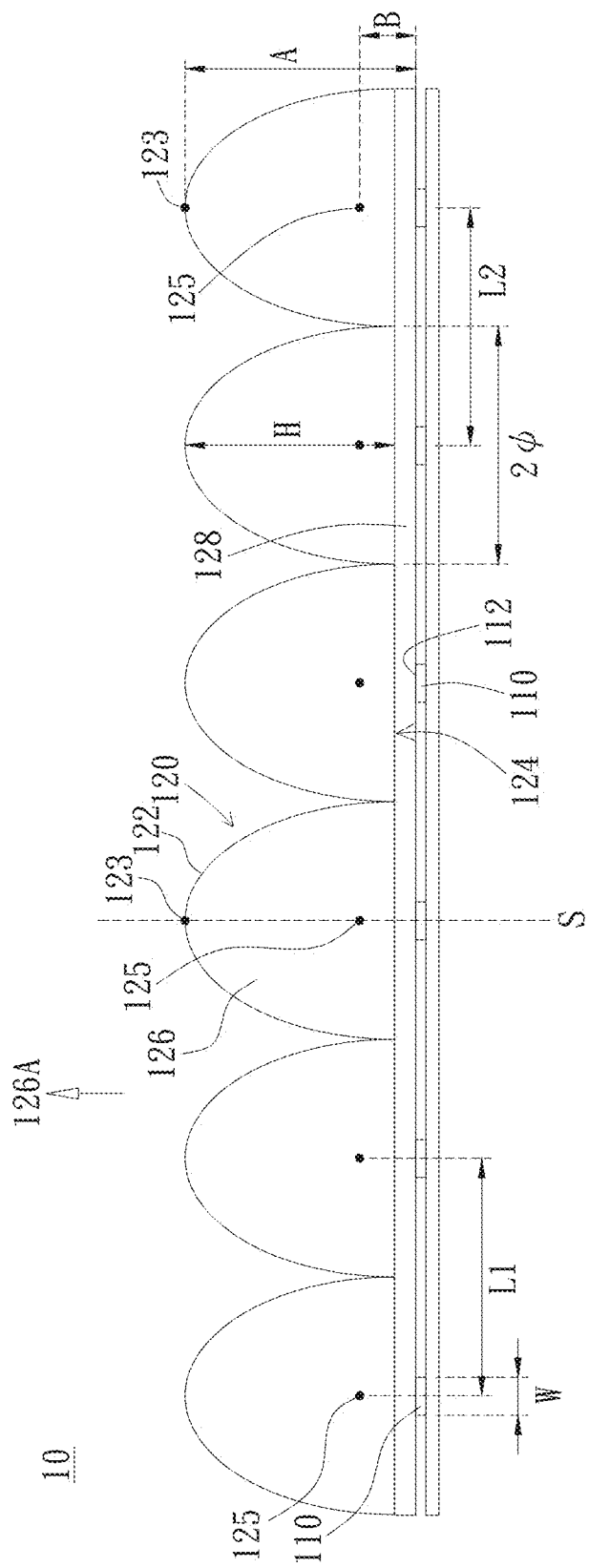
FIG. 1A is a schematic diagram of an embodiment of a backlight module according to the present invention.

FIG. 1A is a schematic diagram of an embodiment of a backlight module 10 according to the present invention. As shown in FIG. 1A, the backlight module 10 includes a plurality of light emitting elements 110 and a plurality of lens structures 120. Each light emitting element 110 has a light emitting surface 112. Each of the plurality of lens structures 120 covers each light emitting element 110 respectively. Preferably, the light emitting surface 112 refers to a range of an area where the light emitting element 110 can actually emit light rays. Each lens structure 120 has a light exit surface 122 having a curved shape. The light exit surface 122 has a vertex 123 and a corresponding focal point 125. For example, a focal point 125 located between the vertex 123 and the light emitting element 110 is formed on a cross section which passes through the vertex 123 and is perpendicular to the light emitting surface 112. Referring to the three-dimensional view of FIG. 1B, the light exit surface 122 forms a slightly hemispherical curved surface. The curved surface is a paraboloid, an ellipsoid, or a hyperboloid.

As shown in FIG. 1A, the light emitting element 110 has a central axis S passing through the light emitting surface 112. The focal point 125 is located on the central axis S. The distance between two adjacent focal points 125 is a first distance L1. That is, the distance between focal points 125 of two adjacent lens structures 120 is the first distance L1. In addition, each light emitting element 110 has a light emitting width W. For example, when the light emitting surface 112 is a circle, the diameter of the light emitting surface 112 is the light emitting width W. When the light emitting surface 112 is a rectangle, the length of a side of the light emitting surface 112 is the light emitting width W. The ratio of the first distance L1 to the light emitting width W is greater than or equal to 10. In an embodiment, the ratio of the first distance L1 to the light emitting width W is 10:1. In other embodiments, the ratio of the first distance L1 to the light emitting width W is 20:1.

Figure 1B:
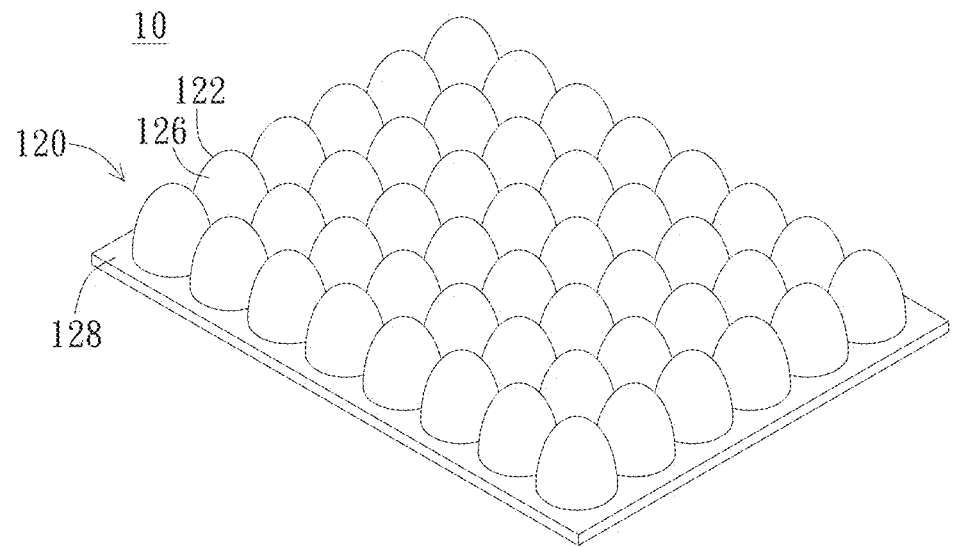
FIG. 1B is a three-dimensional view of the backlight module in FIG. 1A.

In addition, in the embodiment of FIG. 1A, the lens structures 120 and the light emitting elements 110 are disposed in a one-to-one way. Referring to FIG. 1B, the lens structures 120 are juxtaposed on a substrate layer 128 to form an array. Specifically, the distance between two adjacent light emitting elements 110 is a second distance L2. For example, a distance between the center of a light emitting element 110 and the center of an adjacent light emitting element 110 is the second distance L2. Preferably, the second distance L2 is equal to the first distance L1. In other words, the second distance L2 and the light emitting width W also have a relationship that the ratio of the second distance L2 to the light emitting width W is greater than or equal to 10 as described above. As shown in FIG. 1A, each lens structure 120 has a bottom surface 124 on a side close to the light emitting element 110. The bottom surface 124 has a diameter of 2ø. The second distance L2 is equal to the diameter of the bottom surface 124. Further, when the first distance L1, the second distance L2, and the diameter 2ø of the bottom surface 124 are equal, the ratio of a vertical projection area of the bottom surface 124 toward the light emitting surface 112 to the area of the light emitting surface 112 is greater than or equal to 100.

In the embodiment shown in FIG. 1A, the lens structures 120 are closely adjacent to each other on sides close to the light emitting surface 112. This is not limited thereto. In addition, in the embodiment of FIG. 1A and FIG. 1B, the lens structure 120 is designed to be slightly hemispherical. In other embodiments, the lens structure 120 uses a long strip lens structure, for example, a slightly semi-cylindrical long strip structure that is juxtaposed along a side of the substrate layer 128.

In terms of the lens structures 120, each lens structure 120 has a convex lens 126 and a substrate layer 128. The convex lens 126 is disposed on the substrate layer 128, and the convex lens 126 has a side protruding (along a direction parallel to a direction 126A in FIG. 1A) toward a direction away from the light emitting surface 112. The bottom surface 124 of the lens structure 120 has a diameter of 2ø. In an embodiment, the ratio of the height H of the convex lens 126 to the radius ø of the bottom surface 124 ranges from 1.7 to 2.1. In other embodiments, the ratio of the height H of the convex lens 126 to the radius ø of the bottom surface 124 ranges from 1.9 to 2.1. By means of this arrangement, relatively collimated light rays are provided.

Additionally, the lens structure has a focal point height of a convex lens. As shown in FIG. 1A, a focal point height B is formed between the focal point 125 and the light emitting surface 112, and an average vertex height A is formed between the vertex 123 and the light emitting surface 112. It should be added that the average vertex height A is preferably equal to a distance between the vertex 123 of each lens structure 120 and the light emitting surface 112. Process factors may cause a slight difference in an elevation of the vertex 123. Therefore, the average vertex height A preferably refers to an average value of a sum of distances between the vertex 123 of each lens structure 120 and the light emitting surface 112. In addition, the focal point 125 is preferably a position where all light rays from the light emitting element 110 converge. Process factors may cause a slight difference in the position where the light rays converge. Therefore, the focal point height B preferably refers to a distance between a position where light rays converge to produce the largest energy density and the light emitting surface 112.

In an embodiment, the ratio of the focal point height B to the average vertex height A is less than or equal to ⅕. In other embodiments, the ratio of the focal point height B to the average vertex height A preferably ranges from 6% to 19%. For example, when the ratio of the height of the convex lens to the radius of the bottom surface is 1.9, the ratio of the focal point height to the vertex height is 6%. When the ratio of the height of the convex lens to the radius of the bottom surface is 2.1, the ratio of the focal point height to the vertex height is 19%. Therefore, the lens structure is adjusted to a proper shape ratio to provide relatively collimated light rays.

Figure 2:
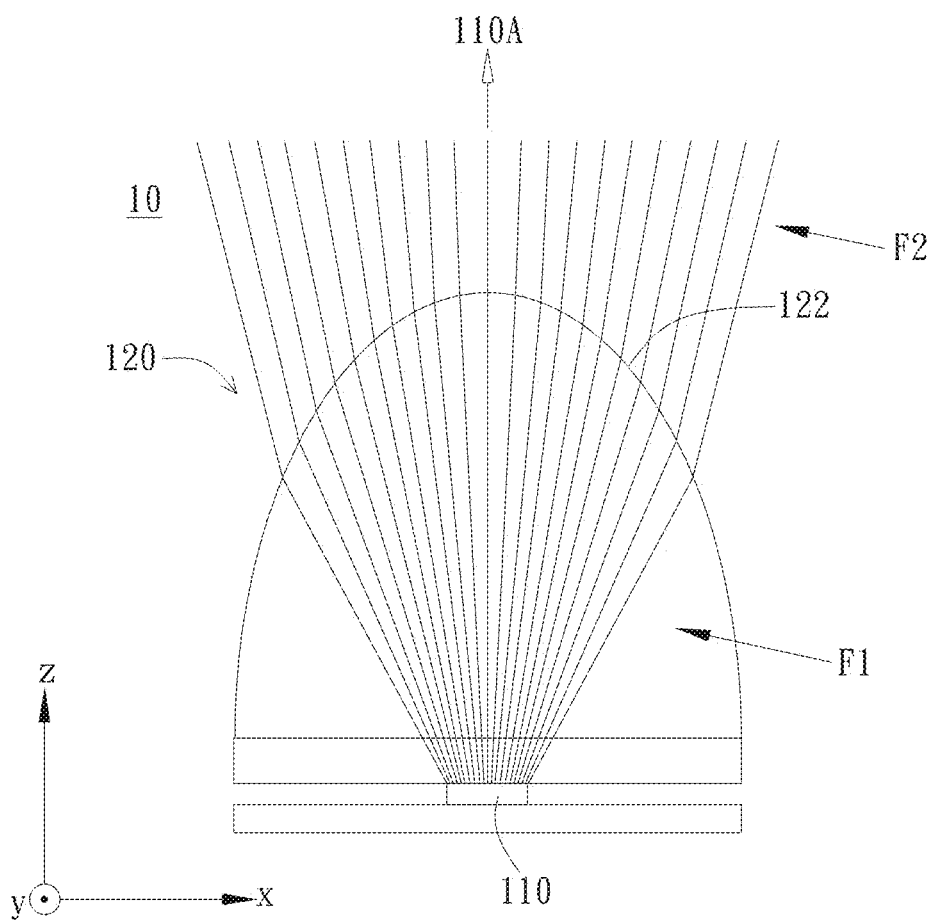
FIG. 2 is a schematic diagram showing different light paths formed by light rays passing through a lens structure.

FIG. 2 is a schematic diagram showing different light paths formed by light rays passing through the lens structure 120. As shown in FIG. 2, the light emitting element 110 has a normal line direction 110A perpendicular to the light emitting surface. The light emitting element 110 emits light rays to form a first light field F1. The light emitting element 110, for example, can be a Lambertian light emitter. The lens structure 120 changes the first light field and makes the first light field converge toward the normal line direction 110A to form a second light field F2, so as to form relatively collimated light rays. Specifically, a full width at half maximum of the light intensity of the second light field is less than or equal to 10 degrees. Additionally, in the second light field, the ratio of a sum of light intensities obtained within a light-exit viewing angle less than or equal to 10 degrees to a sum of light intensities at a full viewing angle is preferably greater than or equal to 60%.

Figure 3:
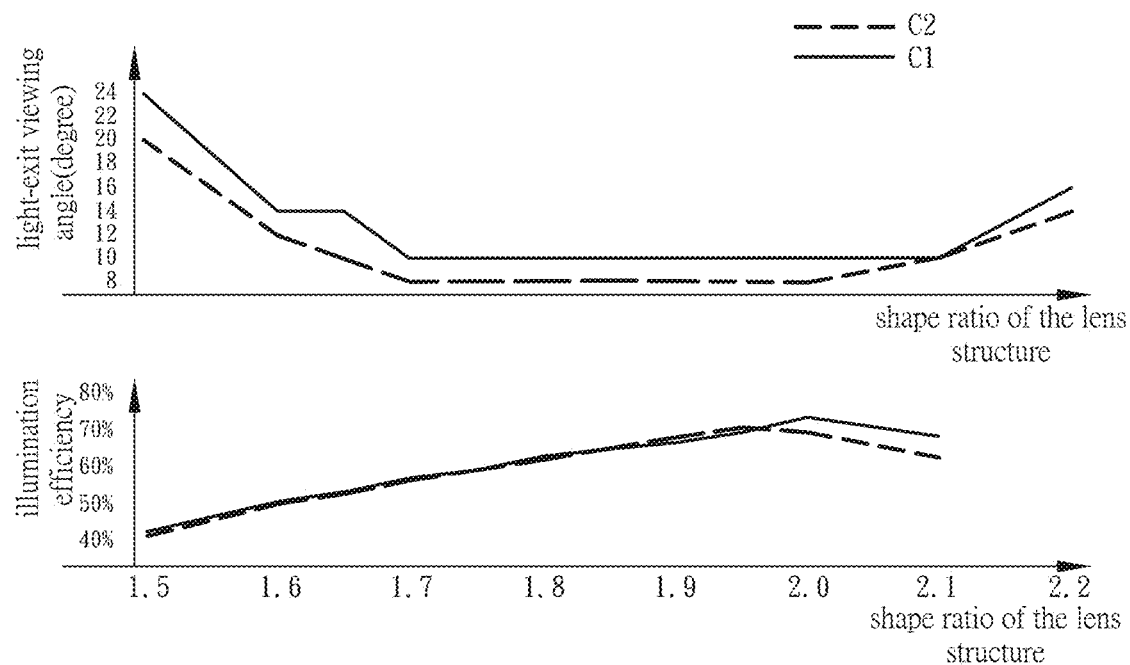
FIG. 3 shows a relationship diagram between a shape ratio of a lens structure and illumination efficiency and a relationship diagram between the shape ratio of the lens structure and a light-exit viewing angle.

FIG. 3 shows a relationship diagram between a shape ratio of a lens structure and illumination efficiency and a relationship diagram between the shape ratio of the lens structure and a light-exit viewing angle. As shown in FIG. 3, the horizontal axis is the shape ratio of the lens structure, and the vertical axes are separately the light-exit viewing angle and the illumination efficiency. The shape ratio of the lens structure refers to a relationship between the height of a convex lens and the radius of a bottom surface. The light-exit viewing angle refers to a viewing angle of the full width at half maximum of the light intensity after light rays are emitted from the lens structure. The illumination efficiency refers to a relationship between a sum of light intensities obtained within a light-exit viewing angle less than or equal to 10 degrees and a sum of light intensities at a full viewing angle. In FIG. 3, the curve C1 shows that the ratio of a first distance (L1) to a light emitting width (W) is 10:1 (i.e., the ratio of a second distance (L2) to the light emitting width (W) is 10:1), and the curve C2 shows that the ratio of the first distance (L1) to the light emitting width (W) is 20:1. As shown in FIG. 3, when the shape ratio of the lens structure ranges from 1.7 to 2.1, the light-exit viewing angle is less than or equal to 10 degrees. For the curve C1, in a case of the foregoing shape ratio of the lens structure, the light-exit viewing angle is 10 degrees, while for the curve C2, the light-exit viewing angle is 8 degrees. In addition, when the shape ratio of the lens structure ranges from 1.7 to 2.1, the illumination efficiency is greater than 55%. Further, when the shape ratio of the lens structure ranges from 1.9 to 2.1, in addition to providing the light-exit viewing angle less than or equal to 10 degrees, the illumination efficiency is greater than or equal to 60%.

Figure 4:
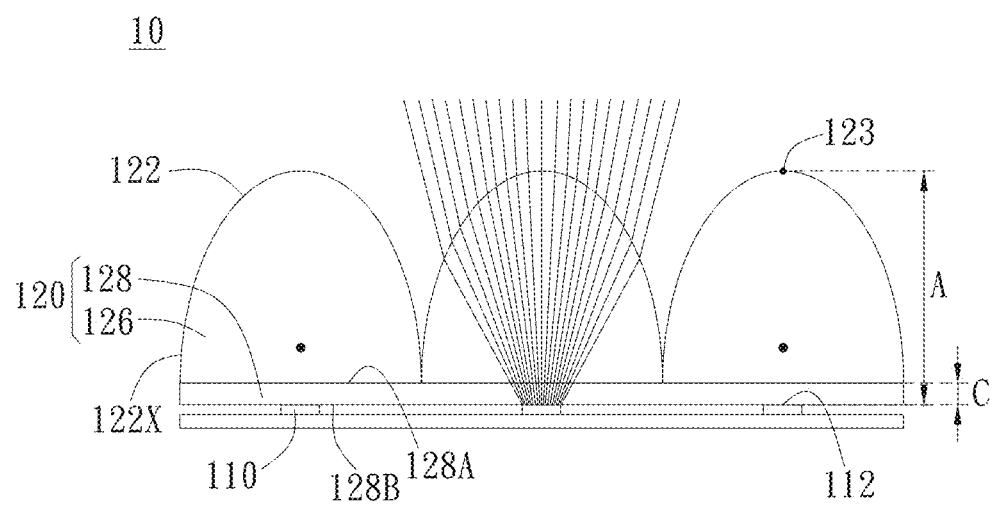
FIG. 4 and FIG. 5 are schematic diagrams of an embodiment of a lens structure having different substrate layer heights.
Figure 5:
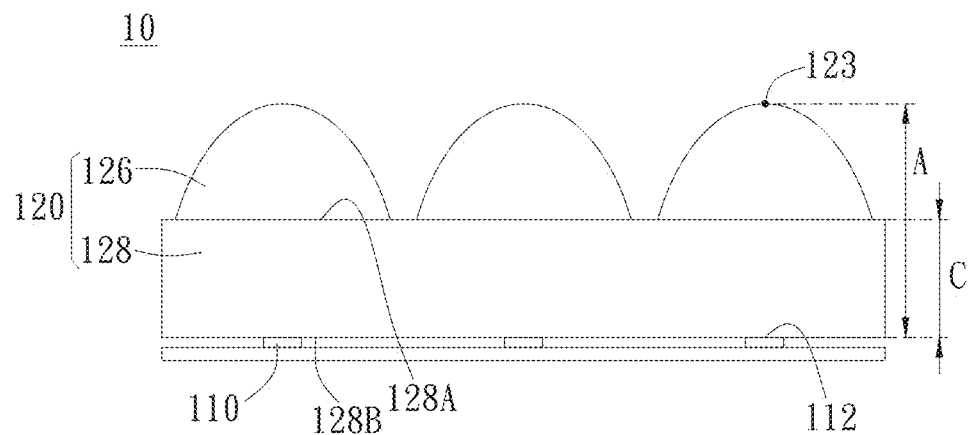

FIG. 4 and FIG. 5 are schematic diagrams of an embodiment of a lens structure 120 having different substrate layer heights. As shown in FIG. 4, the lens structure 120 has a convex lens 126 and a substrate layer 128. The substrate layer 128 has an upper surface 128A and a lower surface 128B opposite to each other. The upper surface 128A is attached to the convex lens 126 and the lower surface 128B faces the light emitting element 110. An average vertex height A is formed between a vertex 123 and a light emitting surface 112. A distance C (that is, the height of the substrate layer) between the upper surface 128A and the light emitting surface 112 is less than the average vertex height A.

Each lens structure 120 has an effective light exit area. The effective light exit area refers to an area through which collimated light rays formed by light rays emitted from a light exit surface pass, and the area occupies a part of the light exit surface. Referring to FIG. 4, the light rays are hardly emitted from the light exit surface (such as a light exit surface 122X) on a side of the lens structure close to the light emitting element to form collimated light rays. Therefore, this area is not an effective light exit area. In a preferable embodiment, the lens structures can be adjusted according to the effective light exit area. As shown in FIG. 5, the ratio of the distance C between the upper surface 128A and the light emitting surface 112 to the average vertex height A is less than or equal to $3/5$. Compared with the foregoing embodiments, in this embodiment, the height C of the substrate layer 128 of FIG. 5 increases, and the height (A-C) of the convex lens 126 decreases. In this way, in addition to providing collimated light rays, the difficulty of producing the convex lens can be reduced and the production yield can be improved.

Figure 6:
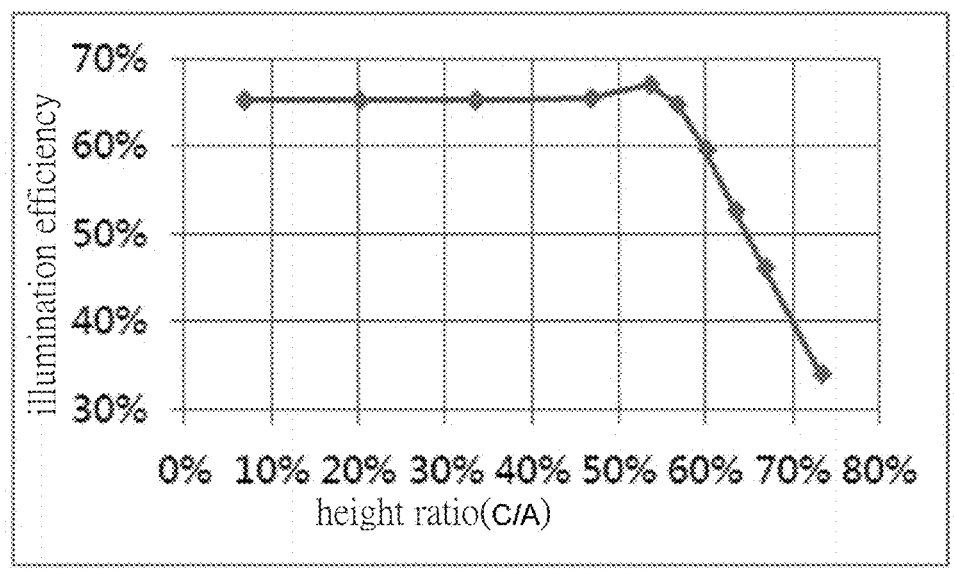
FIG. 6 is a relationship diagram between a height ratio of a substrate layer to a lens structure and illumination efficiency.

FIG. 6 is a relationship diagram between a height ratio of a substrate layer to a lens structure and illumination efficiency according to an embodiment. As shown in FIG. 6, the horizontal axis is the height ratio, and the vertical axis is the illumination efficiency. The height ratio refers to a relationship (C/A) between a distance (that is, a height C of a substrate layer 128) between an upper surface 128A and a light emitting surface 112 and an average vertex height A. The illumination efficiency refers to a relationship between a sum of light intensities obtained within a light-exit viewing angle less than or equal to 10 degrees and a sum of light intensities at a full viewing angle. In FIG. 6, when the height ratio (C/A) is below 10% to 60%, the illumination efficiency is greater than or equal to 60%. When the height C of the substrate layer 128 is increased, preferably, a height ratio of 45% to 55% is used to provide the illumination efficiency slightly more than 60%.

Figure 7:
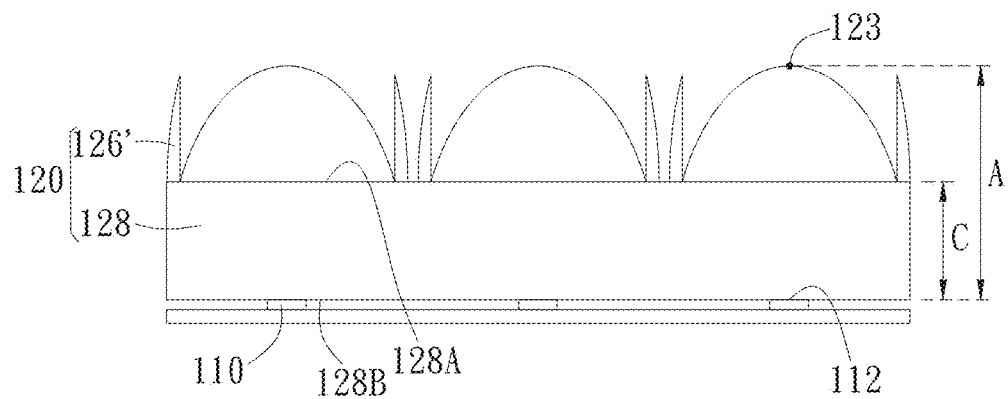
FIG. 7 and FIG. 8 are schematic diagrams of different embodiments of a lens structure forming a thin lens.
Figure 8:
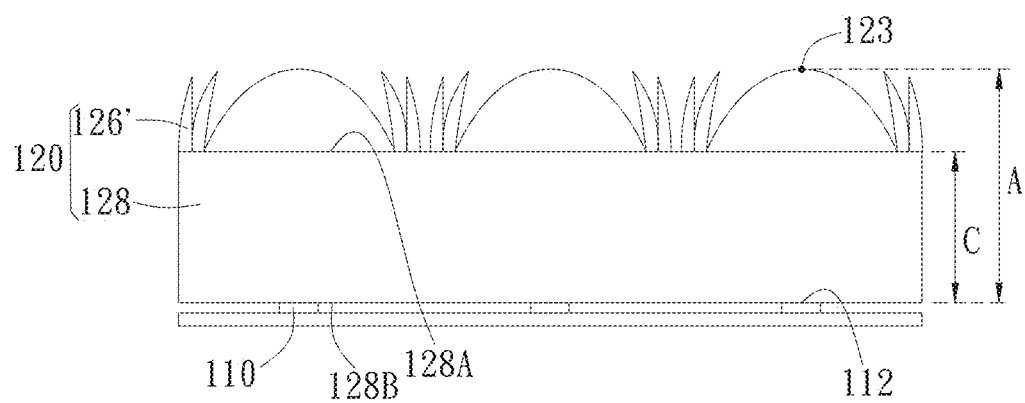

FIG. 7 and FIG. 8 are schematic diagrams of different embodiments of a lens structure 120 forming a thin lens. The lens structure further includes a thin lens according to an effective light exit area, such as a Fresnel lens. As shown in FIG. 7, each lens structure 120 has a thin lens 126' formed according to the effective light exit area. FIG. 8 shows another form of thin lens 126' having a smaller height (A-C), and correspondingly increasing the height C of the substrate layer 128. In the embodiments of FIG. 5, FIG. 7, and FIG. 8, the lens structures 120 are disposed separately from each other on sides close to the light emitting surface 112. It should be noted that when the lens structure 120 increases the height C of the substrate layer 128 or changes a convex lens to a thin lens, a vertex elevation remains unchanged. In other words, the average vertex height A still remains the same to provide consistent light exit effects.

Figure 9:
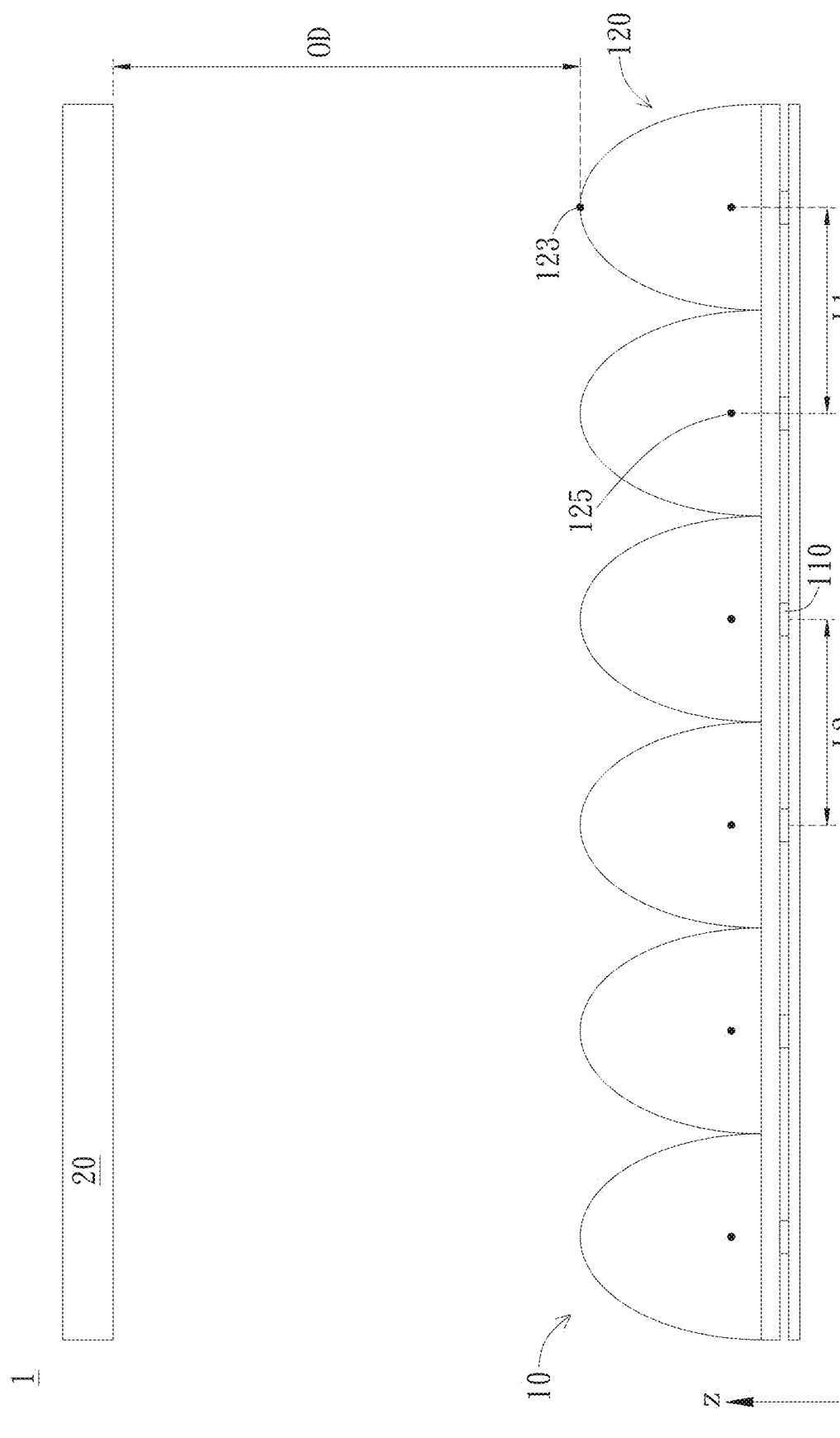
FIG. 9 is a schematic diagram of an embodiment of a display device according to the present invention.

FIG. 9 is a schematic diagram of an embodiment of a display device 1 according to the present invention. As shown in FIG. 9, the display device 1 includes a backlight module 10 and a display panel 20 disposed on a side of the backlight module 10. A vertex 123 of each lens structure 120 of the backlight module 10 and the display panel 20 have an optical distance OD. The ratio of the optical distance to a first distance (L1) is greater than or equal to 10. In the embodiment of FIG. 9, the backlight module 20 disposed in the manner shown in FIG. 2 is used. Therefore, the ratio of the optical distance OD to a second distance L2 between light emitting elements 110 is greater than or equal to 10. In this way, uniform light exit distribution of the display device is provided.

In a preferred embodiment, the optical distance is defined as OD=N×L2. In the foregoing relationship equation, OD is the optical distance and represents a distance between the vertex of each lens structure and the display panel, N is a distance parameter, L2 is the second distance between the light emitting elements 110, and the distance parameter N is a proportional coefficient of the optical distance and the second distance between the light emitting elements. The distance parameter N is preferably less than or equal to 15 and greater than or equal to 10.

Figure 10:
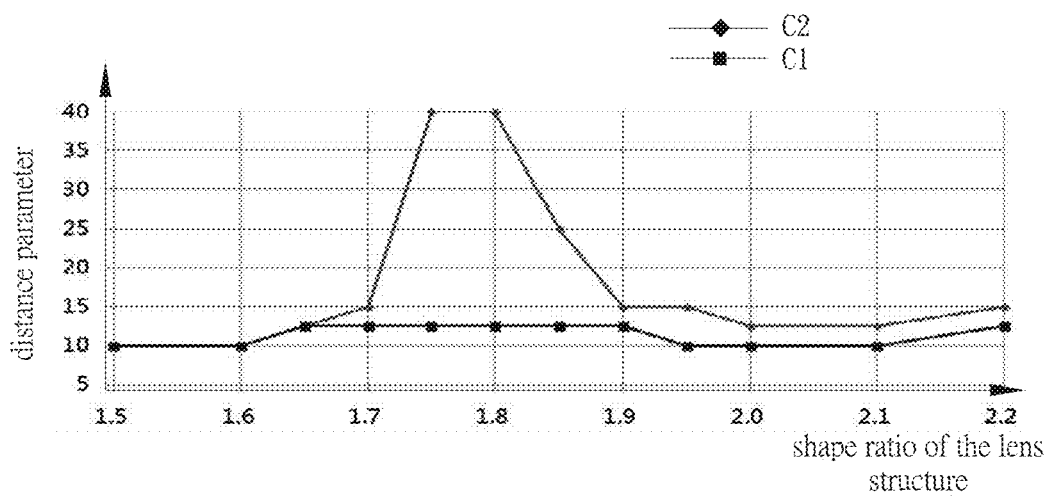
FIG. 10 is a relationship diagram between a shape ratio of a lens structure and a distance parameter.

FIG. 10 is a relationship diagram between a shape ratio of a lens structure and a distance parameter, to present distance parameters corresponding to different ratios of heights of convex lenses to radii of bottom surfaces. As shown in FIG. 10, the horizontal axis is the shape ratio of the lens structure, and the vertical axis is the distance parameter. In FIG. 10, the curve C1 shows that the ratio of a first distance (L1) to a light emitting width (W) is 10:1 (corresponding to the ratio of a second distance (L2) between light emitting elements to the light emitting width (W) being 10:1). The curve C2 shows that the ratio of the first distance (L1) to the light emitting width (W) is 20:1 (corresponding to the ratio of the second distance (L2) between the light emitting elements to the light emitting width (W) being 20:1). As shown in FIG. 10, when the shape ratio of the lens structure ranges from 1.7 to 2.1, for the curve C1, the distance parameter N preferably ranges from 10 to 15. For the curve C2, when the shape ratio of the lens structure ranges from 1.9 to 2.1, the distance parameter N preferably ranges from 10 to 15. Referring to FIG. 3 and FIG. 10, when the shape ratio of the lens structure ranges from 1.9 to 2.1, whether using a setting manner of the curve C1 or C2, a smaller light-exit viewing angle, an illumination efficiency greater than 60%, and a smaller distance parameter (corresponding to a smaller thickness of the display device) can be provided. The shape ratio of the lens structure preferably ranges from 1.9 to 2.1.

Figure 11:
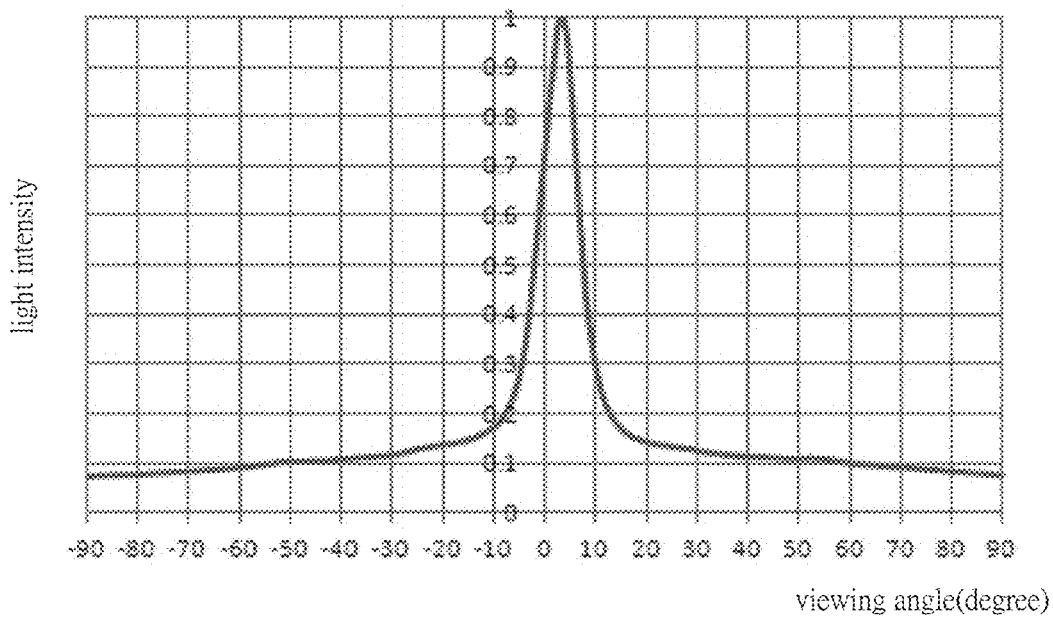
FIG. 11 is a schematic diagram of an embodiment of a viewing angle.

FIG. 11 is a schematic diagram of an embodiment of a light-exit viewing angle of a lens structure. In this embodiment, a second distance between light emitting elements is 3 mm, a light emitting width of the light emitting element is 0.3 mm, and a viewing angle of the full width at half maximum of the light intensity is measured after light rays are emitted from the lens structure. As shown in FIG. 11, the viewing angle of the full width at half maximum of the light intensity is about 9.7 degrees. Most of the light intensities are concentrated in a viewing angle range within 10 degrees. In this way, collimated light rays are provided.

Figure 12A:
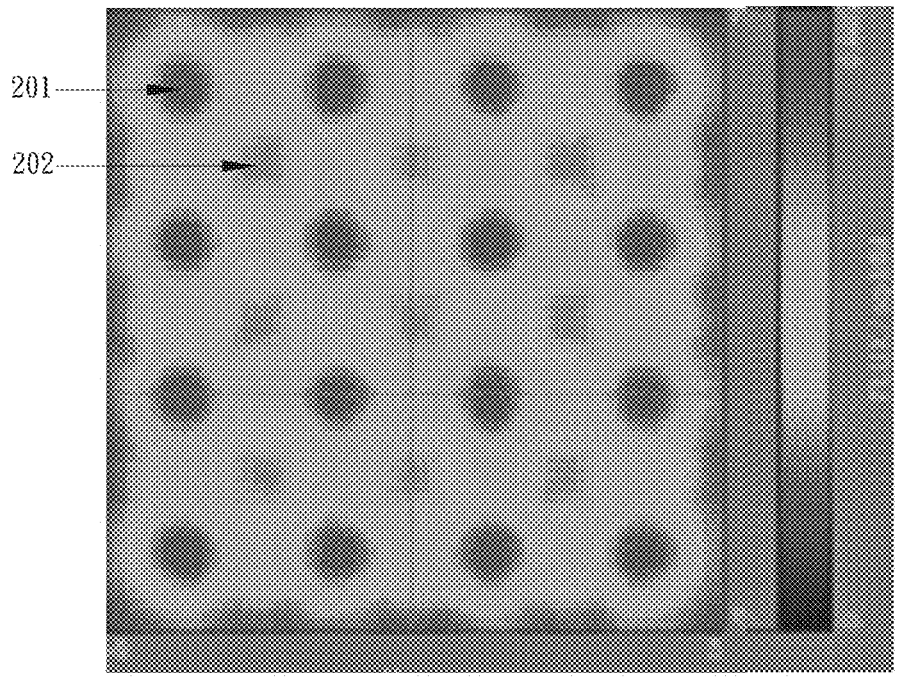
FIG. 12A and FIG. 12B are schematic diagrams of a display device before and after a light exit distribution adjustment.
Figure 12B:
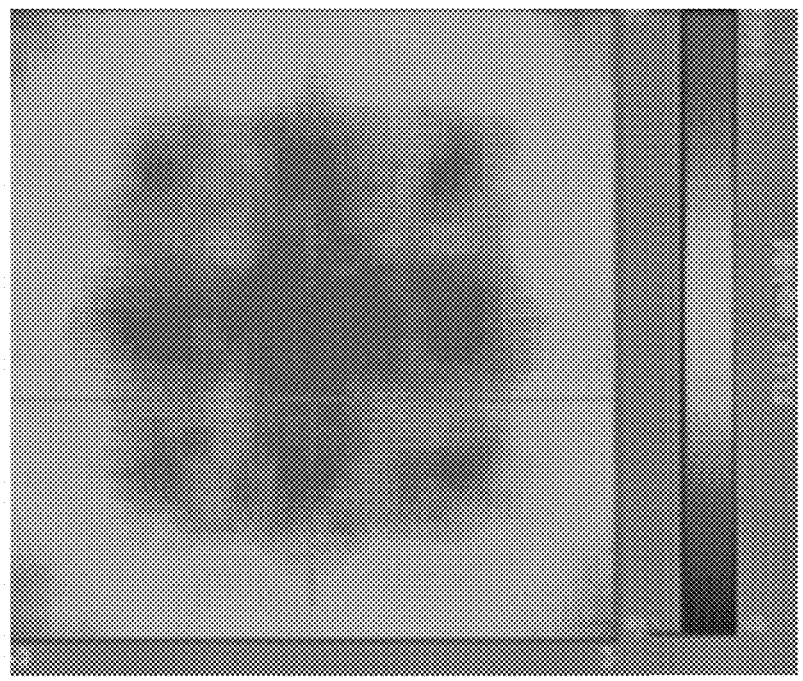

FIG. 12A and FIG. 12B are schematic diagrams of a display device before and after a light exit distribution adjustment. In FIG. 12A, light exit distribution of the display device is measured by setting a second distance between light emitting elements to 3 mm, a light emitting width of the light emitting element to 0.3 mm, a viewing angle of the full width at half maximum of a light intensity to 10 degrees, and an optical distance to 5 mm (corresponding to a distance parameter of 1.67). As shown in FIG. 12A, the light exit distribution of the display device presents uneven brightness, and has a relatively obvious local bright area 201 and a dark area 202. In FIG. 12B, light exit distribution of the display device is measured by setting a second distance between light emitting elements to be 3 mm, a light emitting width of the light emitting element to 0.3 mm, a viewing angle of the full width at half maximum of a light intensity peak to 10 degrees, and an optical distance to 30 mm (corresponding to a distance parameter of 10). As shown in FIG. 12B, as the optical distance increases, the uniformity in the light exit distribution of the display device is obviously improved.

The present invention has been described with reference to the above embodiments, but the above embodiments are merely examples for implementing the present invention. It should be noted that the disclosed embodiments are not intended to limit the scope of the present invention. On the contrary, any modification and equivalent configuration within the spirit and scope of the appended claims shall fall within the scope of the present invention.

What is claimed is:

1. A backlight module, comprising:
   a plurality of light emitting elements, wherein each light emitting element has a light emitting surface; and
   a plurality of adjacent lens structures, each of which covering each light emitting element respectively, wherein each lens structure has a light exit surface having a curved shape, and the light exit surface has a vertex and a focal point located between the vertex and the light emitting element,
   wherein the distance between the focal points of two adjacent lens structures is a first distance (L1), each light emitting element has a light emitting width (w), and the ratio of the first distance (L1) to the light emitting width (w) is greater than or equal to 10.

2. The backlight module according to claim 1, wherein each lens structure has a convex lens, and a side protruding toward a direction away from the light emitting surface, and wherein each lens structure has a bottom surface on a side close to the light emitting elements, and the ratio of the height of the convex lens to the radius of the bottom surface ranges from 1.9 to 2.1.

3. The backlight module according to claim 1, wherein an average vertex height is formed between the vertex and the light emitting surface, a focal point height is formed between the focal point and the light emitting surface, and the ratio of the focal point height to the average vertex height is less than or equal to 1/5.

4. The backlight module according to claim 3, wherein the ratio of the focal point height to the average vertex height ranges from 6% to 19%.

5. The backlight module according to claim 1, wherein the distance between two adjacent light emitting elements is a second distance (L2), each lens structure having a bottom surface on a side close to the light emitting elements, and the second distance being equal to the diameter of the bottom surface.

6. The backlight module according to claim 5, wherein the second distance (L2) is equal to the first distance (L1).

7. The backlight module according to claim 1, wherein an average vertex height (A) is formed between each vertex and each light emitting surface, each lens structure has a convex lens and a substrate layer, and each substrate layer has an upper surface and a lower surface opposite to each other, wherein each upper surface is attached to each convex lens and each lower surface faces each light emitting element, and a distance (C) between each upper surface and each light emitting surface is less than the average vertex height (A).

8. The backlight module according to claim 7, wherein the ratio of the distance (C) between each upper surface and each light emitting surface to the average vertex height (A) is less than or equal to 3/5.

9. The backlight module according to claim 7, wherein each lens structure has an effective light exit area, and the lens structure is a thin lens formed based on the effective light exit area.

10. The backlight module according to claim 1, wherein the light emitting elements have a normal line direction; the light emitting elements emit light rays to form a first light field; and the lens structure changes the first light field in which the first light field is converged toward the normal line direction to form a second light field, and a full width at half maximum of the light intensity of the second light field is less than or equal to 10 degrees.

11. The backlight module according to claim 10, wherein in the second light field, the ratio of a sum of light intensities obtained within a light-exit viewing angle less than or equal to 10 degrees to a sum of light intensities at a full viewing angle is greater than or equal to 60%.

12. A display device, comprising:
   the backlight module according to claim 1; and
   a display panel, disposed on a side of the backlight module,
   wherein the distance between the vertex of each lens structure and the display panel is an optical distance (OD), and the ratio of the optical distance to the first distance (L1) is greater than or equal to 10.

13. The display device according to claim 12, wherein the optical distance (OD) is defined as:
   OD=N×L2, wherein OD is a distance between the vertex of each lens structure and the display panel, N is a distance parameter, L2 is a second distance between the light emitting elements, and the distance parameter is less than or equal to 15 and greater than or equal to 10.

* * * * *